US012809400B2

(12) United States Patent
Tang et al.

(10) Patent No.: US 12,809,400 B2
(45) Date of Patent: Nov. 24, 2026

(54) TEST DEVICE AND METHOD FOR REMOTE CONTROL PARKING

(71) Applicants: CATARC Automotive Test Center (Tianjin) Co., Ltd., Tianjin (CN); CATARC Intelligent Technology (Tianjin) Co., Ltd., Tianjin (CN)

(72) Inventors: Shasha Tang, Tianjin (CN); Xiaodi Tian, Tianjin (CN); Fujian He, Tianjin (CN); Guokai Jiang, Tianjin (CN); Bowei Zou, Tianjin (CN); Feiyan Wu, Tianjin (CN); Xuebin Shao, Tianjin (CN); Rupeng Dou, Tianjin (CN); Yu Wang, Tianjin (CN); Xiucheng Li, Tianjin (CN); Jiaxu Feng, Tianjin (CN); Zhiqiang Yang, Tianjin (CN); Quan Wen, Tianjin (CN); Wenjun Sun, Tianjin (CN); Xiaolong Zhao, Tianjin (CN); Jinna Fan, Tianjin (CN); Lijuan Zou, Tianjin (CN)

(73) Assignees: CATARC Automotive Test Center (Tianjin) Co., Ltd., Tianjin (CN); CATARC Intelligent Technology (Tianjin) Co., Ltd., Tianjin (CN)

( * ) Notice: Subject to any disclaimer, the term of this patent is extended or adjusted under 35 U.S.C. 154(b) by 66 days.

(21) Appl. No.: 18/957,925

(22) Filed: Nov. 25, 2024

(65) Prior Publication Data

US 2025/0085724 A1 Mar. 13, 2025

(30) Foreign Application Priority Data

Oct. 25, 2024 (CN) ......................... 202411498910.7

(51) Int. Cl.
*G05D 1/86* (2024.01)
*G05D 1/221* (2024.01)
(Continued)

(52) U.S. Cl.
CPC ............... *G05D 1/86* (2024.01); *G05D 1/221* (2024.01); *G05D 1/248* (2024.01);
(Continued)

(58) Field of Classification Search
CPC .......... G05D 1/86; G05D 1/221; G05D 1/248; G05D 2109/10; G05D 2111/32;
(Continued)

(56) References Cited

U.S. PATENT DOCUMENTS

2009/0049759 A1 2/2009 Huang
2016/0082933 A1 3/2016 Iwata et al.
(Continued)

*Primary Examiner* — Tuan C To
*Assistant Examiner* — Dominick Mulder
(74) *Attorney, Agent, or Firm* — Westbridge IP LLC

(57) ABSTRACT

Disclosed is a test device and method for remote control parking, falling within the technical field of testing. The method provided by the present disclosure includes the following steps: responding to a remote control parking instruction sent by a portable terminal, and acquiring position and pose data of a vehicle in real-time; injecting function loss conditions; determining a stopping position of the vehicle according to the position and pose data if an alarm signal or a parking success signal sent by an in-vehicle infotainment system is received; and determining a test result of remote control parking according to the stopping position of the vehicle and the function loss conditions. The present disclosure is used to test the response of a vehicle parking under the function loss condition.

17 Claims, 3 Drawing Sheets

(51) Int. Cl.
*G05D 1/248* (2024.01)
*G05D 109/10* (2024.01)
*G05D 111/30* (2024.01)
*G05D 111/50* (2024.01)

(52) U.S. Cl.
CPC ...... *G05D 2109/10* (2024.01); *G05D 2111/32* (2024.01); *G05D 2111/54* (2024.01)

(58) Field of Classification Search
CPC ........... G05D 2111/54; G05D 2107/13; G05D 1/2274; B62D 15/0285; G05B 23/0213; G01M 17/007
USPC .............................................................. 701/2
See application file for complete search history.

(56) References Cited

U.S. PATENT DOCUMENTS

2017/0123421 A1* 5/2017 Kentley ............. G01C 21/3453
2017/0123429 A1* 5/2017 Levinson ........... B60W 60/0011
2018/0100783 A1* 4/2018 Stieff ................... H04N 9/3194
2018/0182183 A1* 6/2018 Mrowczynski ........ G08C 17/00
2019/0220035 A1* 7/2019 Wengreen ............ G05D 1/0278
2019/0225209 A1 7/2019 Seki
2020/0307559 A1* 10/2020 Göricke ................. G08G 1/168
2020/0339108 A1* 10/2020 Takemura ............. B60W 30/06
2021/0253090 A1* 8/2021 Hayakawa ............ B60W 30/06
2021/0253118 A1* 8/2021 Wang .................. B60W 50/035
2022/0194431 A1* 6/2022 Chu .................. B60W 60/0051
2022/0212680 A1* 7/2022 Wang .................... B60W 30/08
2022/0288490 A1* 9/2022 Kaku .................... A63F 13/428
2022/0289217 A1* 9/2022 Guvenc ................. B60W 50/04
2022/0329779 A1* 10/2022 Jun ........................ H04N 17/06
2022/0355791 A1* 11/2022 Hao ...................... B60W 30/06
2022/0410857 A1* 12/2022 Li ............................. B60T 8/92
2023/0037543 A1* 2/2023 Konrardy ........... G01C 21/3461
2023/0278575 A1* 9/2023 Shimamoto ........... B60W 30/06
701/23
2024/0126279 A1* 4/2024 Patel .................... G05D 1/0016
2024/0280997 A1* 8/2024 Oba ......................... G08G 1/20
2024/0370028 A1* 11/2024 Fritz ...................... G05D 1/226
2025/0045191 A1* 2/2025 Zhao ................... G06F 11/3688

* cited by examiner

TEST DEVICE AND METHOD FOR REMOTE CONTROL PARKING

This patent application claims the benefit and priority of Chinese Patent Application No. 2024114989107 filed on Oct. 25, 2024, the disclosure of which is incorporated by reference herein in its entirety as part of the present application.

TECHNICAL FIELD

The present disclosure relates to the technical field of testing, and in particular, to a test device and method for remote control parking.

BACKGROUND

With the rapid development of intelligent transportation systems, intelligent and internet-connected technologies are gradually being applied to the automotive field, injecting a constant flow of power into the high-quality development of the automotive industry. Due to accelerated urbanization and rapid growth in the number of vehicles, parking areas have become narrower. Therefore, finding more efficient and safe parking solutions has become an important issue. Remote control parking, as an application scenario of intelligent internet-connected automobiles, can solve problems of low efficiency and difficult parking. The remote control parking is a product of the combination of Internet of Vehicles and autonomous driving technology, allowing a tester to use remote control devices to control a parking action of the automobile without directly operating a steering wheel and a pedal of the vehicle, greatly improving the safety and convenience of parking and reducing the risk of accidents during parking and the energy of manual parking. However, the safety and reliability of remote control parking technology need to be considered, and a set of perfect test equipment and methodology is urgently needed to realize the whole process verification. Therefore, research on remote control parking test equipment and how to test and verify a remote control parking scenario has become a hot issue.

At present, research on automobile remote control parking test technology is relatively rare at home and abroad. The existing test methods do not have a set of comprehensive remote control parking test equipment and methods based on function loss conditions, and the safety and reliability under the function loss conditions of the remote control parking cannot be tested objectively and reproducibly.

SUMMARY

In view of the above problems, the present disclosure provides a test device and method for remote control parking, which is used to test the response of a vehicle parking under function loss conditions.

In a first aspect, an embodiment of the present disclosure provides a test method for remote control parking, including:

- responding to a remote control parking instruction sent by a portable terminal, and acquiring position and pose data of a vehicle in real-time;
- injecting function loss conditions;
- determining a stopping position of the vehicle according to the position and pose data if an alarm signal or a parking success signal sent by an in-vehicle infotainment system is received; and
- determining a test result of remote control parking according to the stopping position of the vehicle and the function loss conditions.

In a second aspect, an embodiment of the present disclosure provides a test device for remote control parking, and the device is deployed on a vehicle and is communicatively connected to a portable terminal and an in-vehicle infotainment system;

- the device comprises sensors and controllers;
- the sensors are used to collect position and pose data of the vehicle and send the data to the controllers; and
- the controllers are used to execute the test method for remote control parking provided by any embodiment.

Compared with the prior art, the embodiment of the present disclosure has the following beneficial effects:

According to the present disclosure, the deficiencies in the existing test method for remote control parking are overcome. The test device and the test method for the parking capacity of the remote control parking under a scenario of function loss are provided, and the safety and reliability under the function loss conditions of the remote control parking can be tested objectively and reproducibly. The test device provided by the present disclosure can be placed inside the vehicle, occupying a small space and facilitating assembly. Therefore, the test environment requirements are low, the test cost is low, and the test efficiency is high. Simultaneously, the test device described in each test is mounted in a fixed manner without repeated disassembly and assembly, so that real state data of a vehicle parking process can be conveniently, objectively and repeatedly recorded, thus achieving the purpose of verifying the parking safety and reliability.

In addition, the present disclosure not only tests whether the vehicle is successfully parked into a parking space, but also tests the sensitivity, safety and response time under special function loss conditions. Multi-dimensional test programs for the remote control parking are provided, thus comprehensively evaluating the performance of the remote control parking under the function loss conditions.

The above description is only an overview of the technical solution of the present disclosure. In order to more clearly understand the technical means of the present disclosure, it may be implemented based on the contents of the description. Additionally, in order to make the above description and other objects, features and advantages of the present disclosure more obvious and easy to understand, preferred embodiments are described in detail as follows.

DESCRIPTION OF DRAWINGS

Various other advantages and benefits are clear to those of ordinary skill in the art by reading the following detailed description of the preferred embodiments. The accompanying drawings are only for the purpose of illustrating the preferred embodiments, and are not considered as limiting the present disclosure. Moreover, the same reference symbols are used to represent the same parts throughout the accompanying drawings. In the drawings.

DETAILED DESCRIPTION

The following description of the exemplary embodiments of the present disclosure is in more detail with reference to the accompanying drawings. Although the exemplary embodiments of the present disclosure are shown in the accompanying drawings, it is to be understood that the present disclosure can be achieved in various forms and is not limited by the embodiments described herein. On the contrary, these embodiments are provided to enable a more thorough understanding of the present disclosure and to fully convey the scope of the present disclosure to those of ordinary skill in the art.

In the description of the present disclosure, unless expressly specified and limited, the terms "mounted," "connected," "be connected to" and "fixed" are to be understood in a broad sense, for example, the connection can be a connection, a detachable connection, an integrated connection, a mechanical connection, an electrical connection, a direct connection, an indirect connection through an intermediate medium, or a communication between the inside of two elements or the interaction between two elements. For those of ordinary skill in the art, specific situations of the above terms in the present disclosure can be understood on a case-by-case basis.

Embodiment 1

The present embodiment provides a test method for remote control parking, which is suitable for testing scenarios of a remote control parking function of a vehicle. Test indicators include whether parking is in place, sensitivity, response time and safety. The method can be executed by a test device for remote control parking, and the remote control parking is deployed in the vehicle and moves with the movement of the vehicle.

Figure 1:
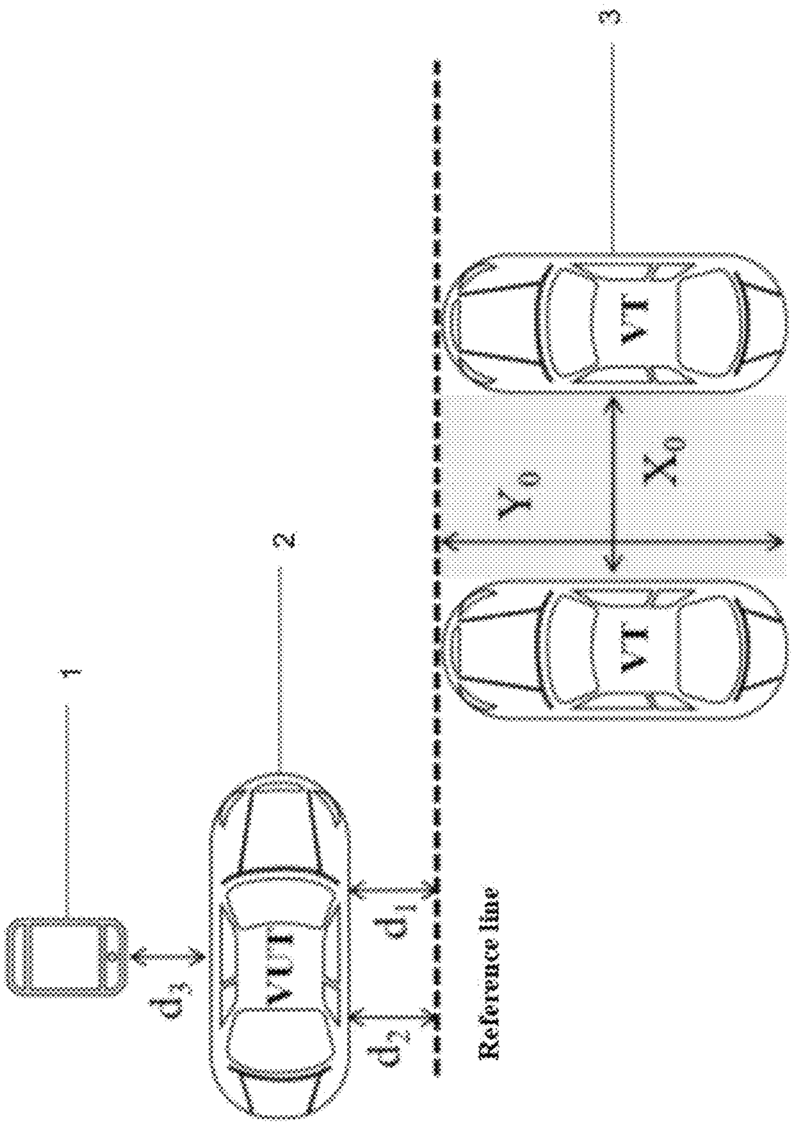
FIG. 1 is a schematic diagram of a remote control parking scenario provided by an embodiment of the present disclosure.

The test device for remote control parking requires a preferred deployment of a test scenario before executing the test. FIG. 1 is a schematic diagram of a remote control parking scenario provided by the embodiment of the present disclosure. A test scenario is selected to construct a parking space according to the functional characteristics of a remote control parking technology for a narrow parking space, and the parking space consisting of two stationary, mutually parallel and vertically placed vehicles 3 is selected, and a test site is selected according to the test scenario. According to the test scenario, the test device for remote control parking is placed in a test vehicle 2 with the remote control parking function. The test device for remote control parking is powered on to verify that the test device for remote control parking works normally. The vehicle 2 is debugged before a formal test. Specifically, verify that the remote control parking function of the vehicle 2 is normally enabled, and observe whether the remote control parking function can be realized normally. The vehicle 2 is placed at a location of the test scenario shown in FIG. 1 to prepare for receiving a remote control parking instruction. FIG. 1 also illustrates a parking space length $X_0$, a parking space width $Y_0$, a lateral distance $d_1$ and $d_2$ between the vehicle 2 and a reference line, and a remote control distance d3 between a portable terminal 1 and the vehicle 2.

Figure 2:
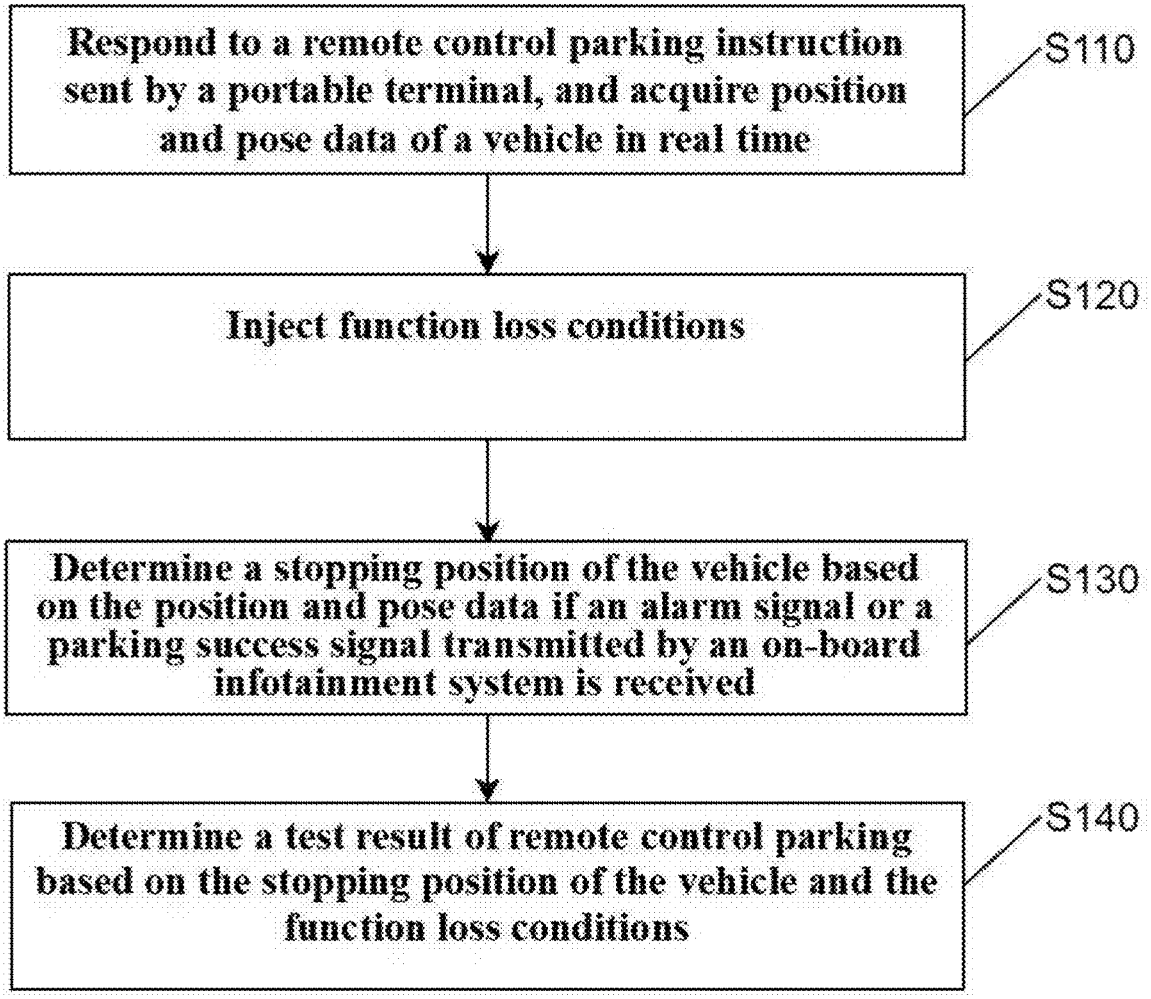
FIG. 2 is a flow diagram of a test method for remote control parking provided by an embodiment of the present disclosure.

The vehicle first searches for the parking space in the test scenario, and then parks after successfully searching for the parking space. A tester opens a parking page on the portable terminal within the effective distance of the remote control (such as 6 m) and sends the remote control parking instruction to the vehicle and the test device for remote control parking. After receiving the remote control parking instruction, the vehicle senses whether there are obstacles such as objects or pedestrians in the parking space through the sensors, and controls a vehicle steering system and a driving system movement to enter the parking space in the absence of the obstacles. The test device for parking also receives the remote control parking instruction and executes the test method provided in this embodiment, referring to FIG. 2, including the following operations:

S110: responding to the remote control parking instruction sent by the portable terminal, acquiring position and pose data of the vehicle in real-time.

The test device for remote control parking includes sensors, such as a positioning antenna, a gyroscope, a non-contact vehicle testing instrument VBOX and a vehicle internet-connected V2X positioning module 7. Since the device is deployed in the vehicle, a position and pose of the device can be determined as the position and pose of the vehicle.

The positioning antenna is used to receive a positioning signal from a GPS satellite to determine a geographical location of the vehicle. The gyroscope is used to record angular velocity and acceleration data of the vehicle. When a GPS signal is lost or unstable, inertial data provided by the gyroscope can be used to extrapolate a moving trajectory of the vehicle to ensure continuous positioning. VBOX is used to collect and record vehicle dynamic data, including position, speed, acceleration and so on. The VBOX can integrate data from different sensors to provide accurate motion analysis. A V2X positioning module is used for vehicle internet-connected communication, providing positioning data and information interaction between vehicle-to-vehicle (V2V), vehicle-to-infrastructure (V2I), and so on. Overall positioning accuracy and reliability are improved by receiving and sending positioning information.

The present embodiment can accurately obtain real-time position data and pose data of the vehicle through the sensors.

S120: injecting function loss conditions.

The function loss conditions include switching of the parking page on the portable terminal, weakening of a communication link between the portable terminal and the vehicle, disconnecting of the communication link between the portable terminal and the vehicle, arranging obstacles around the parking space, and parking control of the portable terminal or an operation of at least one of the vehicles by the tester. In some examples, the test device for remote control parking controls switching of the parking page, weakening of the communication link, disconnecting of the communication link, and performing parking control by issuing the instruction to the portable terminal. The test device for remote control parking notifies the tester to operate the vehicle by issuing a voice instruction to the tester. The test device for remote control parking controls the movement of a mobile device by sending the instruction to the mobile device of the obstacles, thus driving the obstacles to a designated position around the parking space.

Optionally, after receiving the remote control parking instruction for a set time (such as 5 s), the function loss conditions are injected. During the parking process of the vehicle, the vehicle detects a function loss and generates a series of responses, which facilitates the subsequent multi-dimensional test of the response.

Optionally, various function loss conditions can be injected and tested on a case-by-case basis. After the test is completed, the vehicle returns to a position shown in FIG. 1, and then new function loss conditions are injected and tested again.

S130: determining a stopping position of the vehicle according to the position and pose data if an alarm signal or a parking success signal sent by an in-vehicle infotainment system is received.

The vehicle is in the process of automatic parking, if the function loss conditions are detected, the vehicle may continue to park until the parking is in place, and the in-vehicle infotainment system sends the parking success signal to the portable terminal and device. Parking may also be suspended, and the in-vehicle infotainment system sends the alarm signal to the portable terminal and the device to indicate a parking failure and request manual intervention.

When the test device for remote control parking receives the alarm signal or the parking success signal, the stopping position of the vehicle is calculated by a kinematic formula according to real-time collected the position and pose data. For example, starting from a parking position, integrating the speed at each moment in time to obtain the distance and driving direction, and drawing a driving trajectory. When the alarm signal or the parking success signal is received, the detected vehicle speed is 0. After the vehicle stops, the end of the driving trajectory is the stopping position of the vehicle. Further, a vehicle position collected by the positioning antenna or the V2X positioning module can be averaged with the stopping position to obtain a more accurate stopping position after fusion.

It is to be noted that the vehicle may repeatedly stop and drive during the parking process. According to the present disclosure, the stopping position of the vehicle is determined after receiving the alarm signal or the parking success signal sent by the in-vehicle infotainment system, so that a motion response of the vehicle after the alarm/parking success can be accurately determined.

S140: determining a test result of the remote control parking according to the stopping position of the vehicle and the function loss conditions.

Different function loss conditions correspond to different test indicators and test results. A test process under each of the function loss conditions is described below.

(1) The function loss conditions are switching of the parking page on the portable terminal.

The injecting function loss conditions include the device sending a parking page switching instruction to the portable terminal, and the parking page switching instruction is used to trigger a portable terminal switching parking page. The portable terminal closes the parking page or minimizes the parking page (background operation). After switching of the parking page on the portable terminal, and the portable terminal returns a switching state of the parking page to the device, indicating that the parking page has been switched. The device receives the switching state of the parking page sent by the portable terminal and records a switching moment t1.

In one case, the vehicle sends the alarm signal after a page switching, and the device records moment t2 when the vehicle sends the alarm signal. A first driving distance of the vehicle is calculated (that is, a driving distance of the vehicle from a position at the t1 moment to the stopping position) according to the stopping position of the vehicle and a position at the t1 moment. A first time difference between t1 and t2 is calculated. The sensitivity of the remote control parking to page switching conditions is tested according to the first driving distance and the first time difference. The first driving distance reflects the response of the vehicle to the page switching at a driving level. The first driving distance is longer, and the sensitivity is lower. The first time difference reflects the response of the vehicle to the page switching at an alarm level. Some vehicles find switching of the parking page earlier to alarm, but control the vehicle parking later, which may not be conducive to the safety of parking. Therefore, the first driving distance is given a first weight, the first time difference is given a second weight, and the first weight is greater than the second weight. The following formula is used to calculate the sensitivity of the remote control parking to the page switching conditions $Y_1$.

$$Y_1 = \frac{1}{a_1 L_1 + b_1 T_1}$$

Wherein: $a_1$ is the first weight, $b_1$ is the second weight, $L_1$ the first driving distance, and $T_1$ is the first time difference. The sensitivity is higher, indicating that the response of the remote control parking of the vehicle is more timely and safer.

In another case, the vehicle continues parking after the page switching and sends the parking success signal. Then, it is determined that the remote control parking is not sensitive to the page switching conditions. This function cannot suspend parking by switching the parking page, and the safety and operability are poor.

(2) The function loss conditions are that the communication link between the portable terminal and the vehicle is disconnected.

The injecting function loss conditions include the device sending an instruction to the portable terminal to disconnect the communication link with the vehicle. The instruction to disconnect the communication link with the vehicle is used to control the portable terminal to disconnect the communication link with the vehicle. For example, the portable terminal disconnects a Bluetooth connection with the vehicle, but still retains the communication link with the device.

The portable terminal returns a disconnected state of the communication link to the device after disconnecting the communication link with the vehicle, indicating that the communication link with the vehicle has been disconnected. The device receives the disconnection state of the communication link sent by the portable terminal and records a disconnection moment t3.

In one case, the vehicle sends the alarm signal after disconnecting the communication link, and the device records moment t4 when the vehicle sends the alarm signal. A second driving distance of the vehicle is calculated (that is, a driving distance of the vehicle from a position at t3 moment to the stopping position) according to the stopping position of the vehicle and the position at the t3 moment. A second time difference between t3 and t4 is calculated. The sensitivity of the remote control parking to communication link disconnection is tested according to the second driving distance and the second time difference. A specific analysis process is similar to the above (1), the second driving distance is given a third weight, the second time difference is given a fourth weight, and the third weight is greater than the fourth weight. The following formula is used to calculate the sensitivity of the remote control parking to the communication link disconnection $Y_2$.

$$Y_2 = \frac{1}{a_2 L_2 + b_2 T_2}$$

Wherein: $a_2$ is the third weight, $b_2$ is the fourth weight, $L_2$ the second driving distance, and $T_2$ is the second time difference. The sensitivity is higher, indicating that the response of the remote control parking of the vehicle is more timely and safer.

In another case, the vehicle continues parking after the link is disconnected, and the parking success signal is sent. Then, it is determined that the remote control parking is not sensitive to the communication link disconnection condition. This function cannot suspend parking by disconnecting the communication link, and the safety and operability are poor.

(3) The function loss conditions are weakening of the communication link between the portable terminal and the vehicle.

The injecting function loss conditions include the device sending an instruction to weaken the communication link to the portable terminal. The instruction to weaken the communication link is used to control the portable terminal to stay away from the vehicle. For example, the tester is notified to hold the portable terminal away from the vehicle to attenuate the strength of communication with the vehicle. In a practical application scenario, when the tester opens the remote control parking and observes a normal parking of the vehicle, generally away from the vehicle to the destination. Or, the portable terminal passes through large obstacles or is interfered with between the portable terminal and the vehicle, resulting in a weakened signal. It can be seen that the weakening of the communication link does not reflect the tester's volition to suspend parking. Therefore, a reliable remote control parking function does not respond to a communication link weakening condition, but continues to park in the place. On this basis, whether the vehicle is successfully parked is determined according to the stopping position of the vehicle, that is, whether the stopping position is located in the parking space. If the parking succeeds, a parking test is passed; if the parking fails, the parking test is not passed, and the parking function is unreliable.

(4) The function loss conditions are arranging obstacles around the parking space. For example, obstacles are arranged on a rear side or left and right sides of the parking space.

Since the obstacles do not occupy the parking space, the reliable parking function can plan an appropriate parking path according to the location of the obstacles and avoid collisions with the obstacles. Based on this, whether the vehicle is successfully parked is determined according to the stopping position of the vehicle. If the vehicle is parked in the parking space, the parking is successful, otherwise the parking fails. If the parking is successful, the parking test is passed, as well as the driving trajectory of the vehicle is determined according to the position and pose data of the vehicle. The safety of the remote parking is tested according to the distance between the driving track and the obstacles. Specifically, the shortest distance between edges of the obstacles and the driving trajectory is calculated. If the shortest distance is less than a preset threshold (such as 3 cm), indicating that the vehicle has the risk of collision with obstacles, and the safety is poor; and if the shortest distance is greater than or equal to the preset threshold, indicating that the vehicle effectively avoids obstacles and has good safety. If the parking test is not passed, the parking has failed.

(5) The function loss conditions are that the portable terminal performs parking control.

The injecting function loss conditions include the device sending a parking control instruction to the portable terminal, and the parking control instruction is used to notify the tester to trigger buttons on the page to perform parking control, including but not limited to stopping and pausing parking. The portable terminal sends the parking control instruction to the vehicle and the device to stop parking or suspend a parking instruction. The device receives the parking control instruction and records moment t5. Moment t7 when the vehicle stops at the stopping position is recorded. Response time of the remote control parking to terminal control is tested according to a third time difference between t5 and t7. The third time difference is shorter, the response time is shorter, and the reliability of the remote control parking function is higher.

(6) The function loss conditions are that the tester operates the vehicle.

The injecting function loss conditions include the device sending the voice instruction to the tester, notifying the tester to operate the vehicle. The tester operates the vehicle while the vehicle is parked, such as opening a door, stepping on an accelerator or brake pedal or rotating a steering wheel. After the in-vehicle infotainment system detects the tester's operation, the tester's operation information is sent to the device. The device first needs to determine whether the operation information is the information to suspend parking. For example, the operation information of opening the door, stepping the accelerator or brake pedal or rotating the steering wheel is the information to suspend parking, and the operation information of adjusting air conditioner/radio/window is not the information to suspend parking. When the information to suspend parking is detected, the moment t6 is recorded. The Moment t7 when the vehicle stops at the stopping position is recorded. The response time of remote control parking to the intervention of testers is tested according to the fourth time difference between t6 and t7. When the tester operates the vehicle, indicating that the tester has an intention to take over the parking, the vehicle is to be stopped immediately. The fourth time difference is shorter, the response time is shorter, and the reliability of the remote control parking function is higher.

According to the present disclosure, the deficiencies in the existing test method for remote control parking are overcome. The test device and the test method for the parking capacity of the remote control parking under a scenario of function loss are provided, and the safety and reliability under the function loss conditions of the remote control parking can be tested objectively and reproducibly. The test device provided by the present disclosure can be placed inside the vehicle, occupying a small space and facilitating assembly. Therefore, the test environment requirements are low, the test cost is low, and the test efficiency is high. Simultaneously, the test device described in each test is mounted in a fixed manner without repeated disassembly and assembly, so that real state data of a vehicle parking process can be conveniently, objectively and repeatedly recorded, thus achieving the purpose of verifying the parking safety and reliability.

In addition, the present disclosure not only tests whether the vehicle is successfully parked into the parking space, but also tests the sensitivity, safety and response time under special function loss conditions. Multi-dimensional test programs for the remote control parking are provided, thus comprehensively evaluating the performance of the remote control parking under the function loss conditions.

Embodiment 2

The embodiment provides a test device for remote control parking, and the device is deployed on a vehicle and is communicatively connected to a portable terminal and an in-vehicle infotainment system. The device includes sensors and controllers, the sensors are used to collect position and pose data of the vehicle and send to the controller, and the controllers are used to execute the test method for remote control parking provided by embodiment 1.

Figure 3:
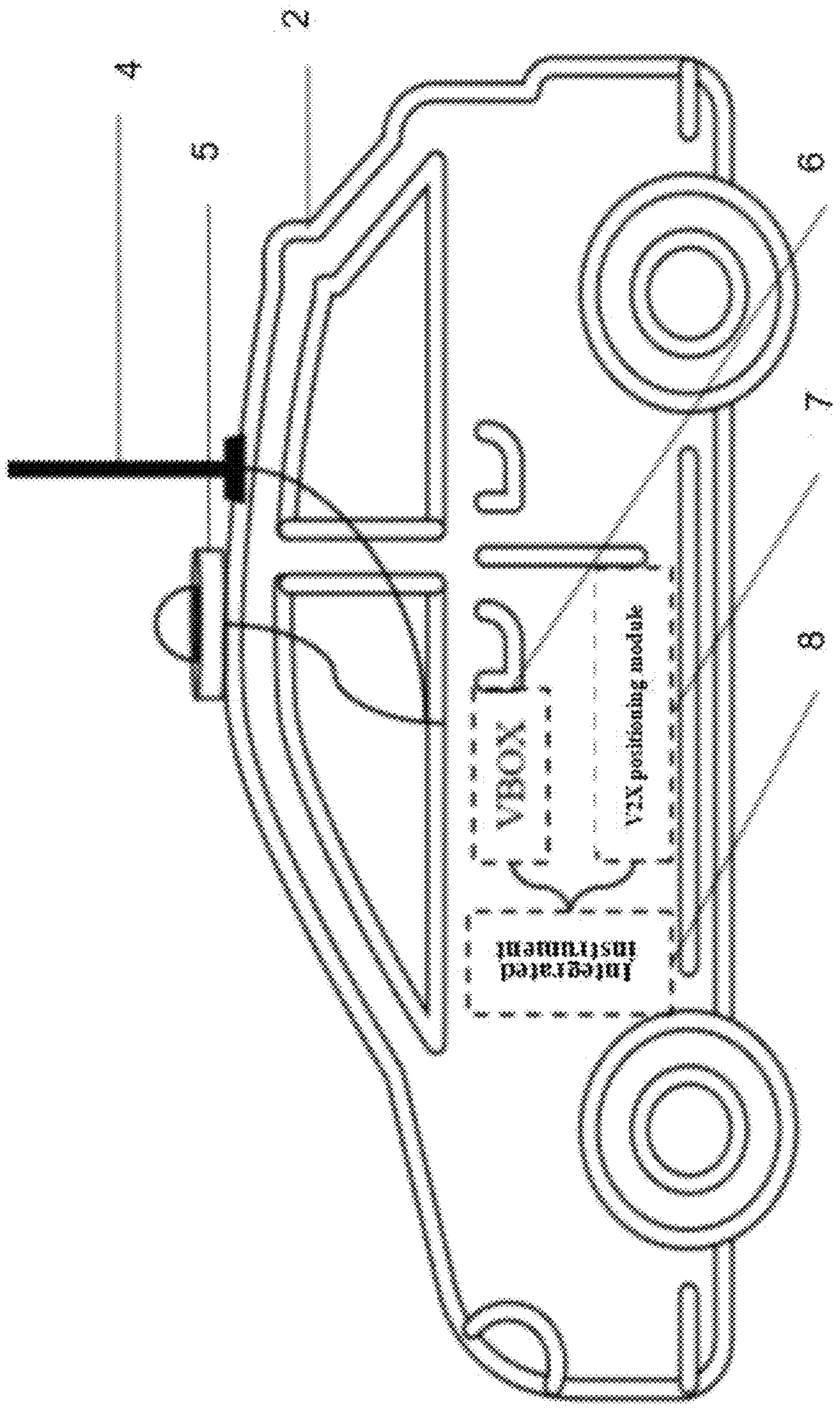
FIG. 3 is a structural schematic diagram of a test device for remote control parking provided by an embodiment of the present disclosure.

Optionally, referring to FIG. 3, the sensors include a positioning antenna 4, a gyroscope 5, a VBOX6 and a V2X positioning module 7. The description of the sensors is described in Embodiment 1, and this is not repeated herein.

Optionally, the controllers are integrated into an integrated instrument 8, and the integrated instrument 8 also includes a camera and a display. The camera collects video information of a test environment, and the display shows the real-time position and pose data of the vehicle to monitor the whole test process in real-time. A placement of the device on the vehicle 2 is shown in FIG. 3. The device uses a removable power supply to provide power security for the device, ensuring that the device works properly in various environments.

The foregoing are only preferred specific embodiments of the present disclosure, but the scope of protection of the present disclosure is not limited thereto. Any changes or substitutions that can be easily thought of by those of ordinary skill in the art within the technical scope disclosed in the present disclosure, are included in the scope of protection of the present disclosure. Therefore, the scope of protection of the present disclosure is to be governed by the scope of protection of the claims.

What is claimed is:

1. A test method for remote control parking, comprising:

responding to a remote control parking instruction sent by a portable terminal, and acquiring position and pose data of a vehicle in real-time;

injecting function loss conditions;

determining a stopping position of the vehicle according to the position and pose data if an alarm signal or a parking success signal sent by an in-vehicle infotainment system is received; and determining a test result of remote control parking according to the stopping position of the vehicle and the function loss conditions;

wherein the function loss conditions comprise switching of a parking page on the portable terminal; and determining the test result of the remote control parking according to the stopping position of the vehicle and the function loss conditions, comprising:

receiving a switching state of the parking page sent by the portable terminal, and recording switching moment t1;

recording moment t2 when the in-vehicle infotainment system sends the alarm signal;

calculating a first driving distance of the vehicle according to the stopping position of the vehicle and a position at moment t1;

calculating a first time difference between t1 and t2; and testing the sensitivity of the remote control parking to page switching conditions according to the first driving distance and the first time difference.

2. The method according to claim 1, wherein the injecting function loss conditions comprise:

sending a parking page switching instruction to the portable terminal; and triggering a portable terminal switching parking page by the parking page switching instruction.

3. The method according to claim 1, wherein the function loss conditions comprise weakening of a communication link between the portable terminal and the vehicle; and determining the test result of the remote control parking according to the stopping position of the vehicle and the function loss conditions, comprising:

determining whether the vehicle is successfully parked according to the stopping position of the vehicle;

passing a parking test if parking is successful; and not passing the parking test if parking is failed.

4. The method according to claim 3, wherein the injecting function loss conditions comprise:

sending an instruction to weaken the communication link to the portable terminal; and controlling the portable terminal to stay away from the vehicle by the instruction to weaken the communication link.

5. The method according to claim 1, wherein the function loss conditions comprise disconnecting of the communication link between the portable terminal and the vehicle; and determining the test result of the remote control parking according to the stopping position of the vehicle and the function loss conditions, comprising:

receiving a disconnected state of the communication link sent by the portable terminal, and recording a disconnected moment t3;

recording moment t4 when the in-vehicle infotainment system sends the alarm signal;

calculating a second driving distance of the vehicle according to the stopping position of the vehicle and a position at moment t3;

calculating a second time difference between t3 and t4; and testing the sensitivity of the remote control parking to communication link disconnection according to the second driving distance and the second time difference.

6. The method according to claim 5, wherein the injecting function loss conditions comprise:

sending an instruction to disconnect the communication link with the vehicle to the portable terminal; and controlling the portable terminal to disconnect the communication link with the vehicle by the instruction to disconnect the communication link with the vehicle.

7. The method according to claim 1, the function loss conditions comprise arranging obstacles around a parking space; and determining the test result of the remote control parking according to the stopping position of the vehicle and the function loss conditions, comprising:

determining whether the vehicle is successfully parked according to the stopping position of the vehicle;

passing the parking test if parking is successful, determining a driving track of the vehicle according to the position and pose data of the vehicle, and testing the safety of the remote control parking according to the distance between the driving track and the obstacles; and not passing the parking test if parking is failed.

8. The method according to claim 1, wherein the function loss conditions comprise controlling parking by the portable terminal or operating the vehicle by a tester; and determining the test result of the remote control parking according to the stopping position of the vehicle and the function loss conditions, comprising:

receiving a parking control instruction sent by the portable terminal and recording moment t5; or receiving operation information of the tester sent by receiving the in-vehicle infotainment system, and recording moment t6;

recording moment t7 when the vehicle stops at the stopping position;

testing response time of the remote control parking to terminal control according to a third time difference between t5 and t7; and testing response time of the remote control parking to an intervention of the tester according to a fourth time difference between t6 and t7.

9. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 1.

10. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 1.

11. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 2.

12. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 3.

13. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 4.

14. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 5.

15. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 6.

16. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 7.

17. A test device for remote control parking, wherein the device is deployed on a vehicle and is communicatively connected to a portable terminal and an in-vehicle infotainment system;

the device comprises sensors and controllers;

the sensors are used to collect position and pose data of the vehicle and send to the controllers; and the controllers are used to execute the test method for remote control parking according to claim 8.

* * * * *